June 19, 1951     A. PALENSKY     2,557,613
COOKING UTENSIL
Filed Feb. 7, 1946     2 Sheets-Sheet 1
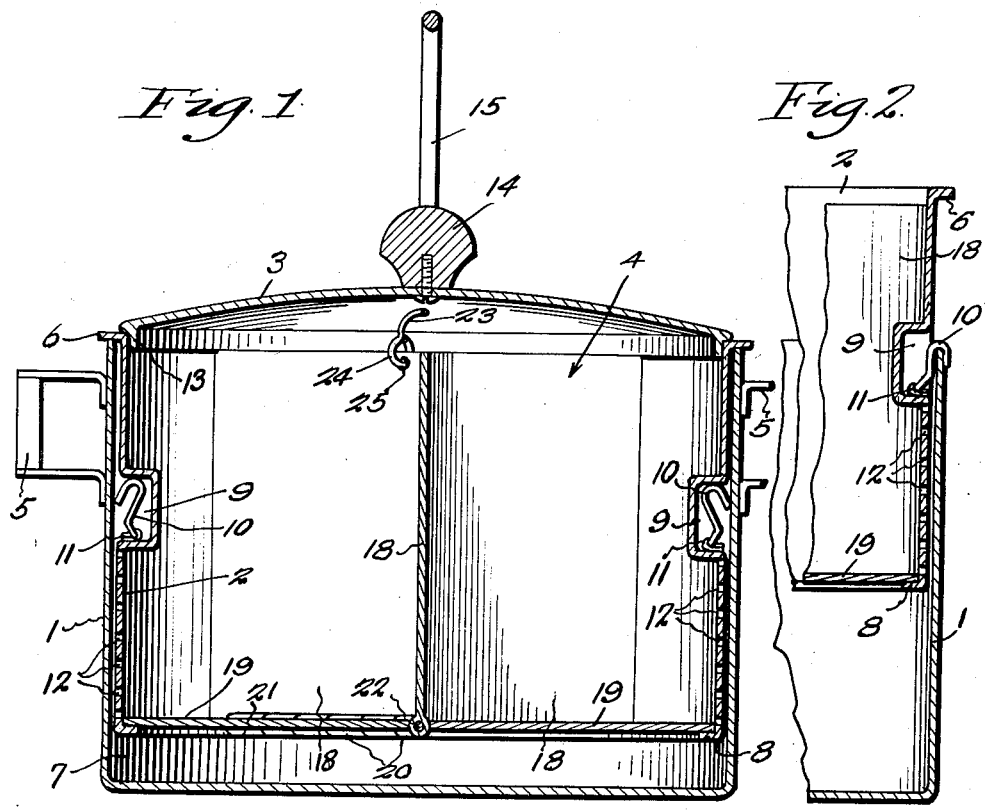
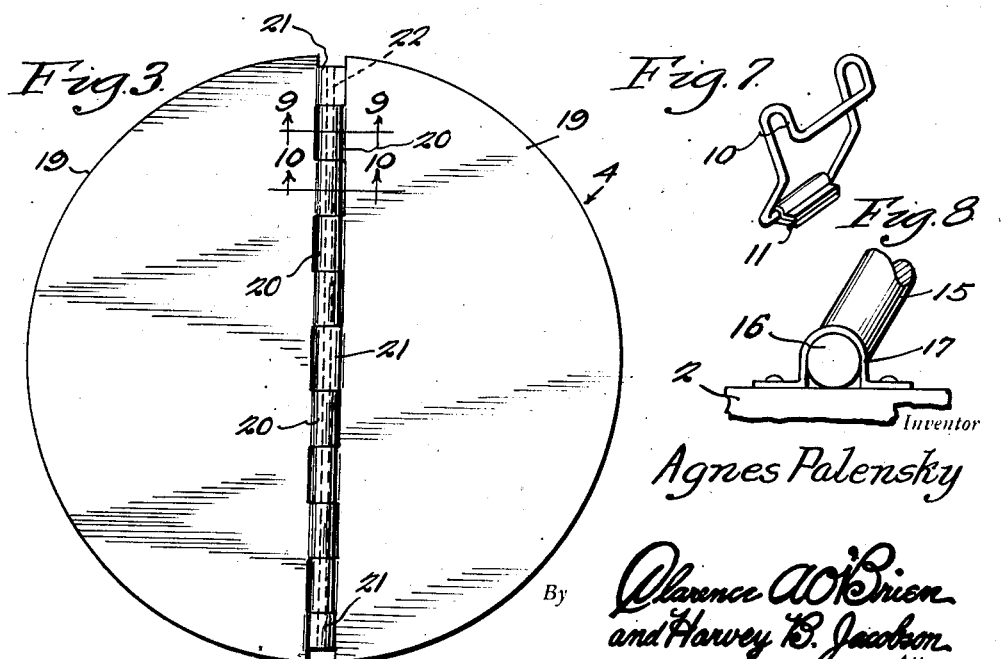
Inventor
Agnes Palensky
By Clarence A. O'Brien
and Harvey B. Jacobson
Attorneys June 19, 1951 — A. PALENSKY — 2,557,613
COOKING UTENSIL
Filed Feb. 7, 1946 — 2 Sheets-Sheet 2
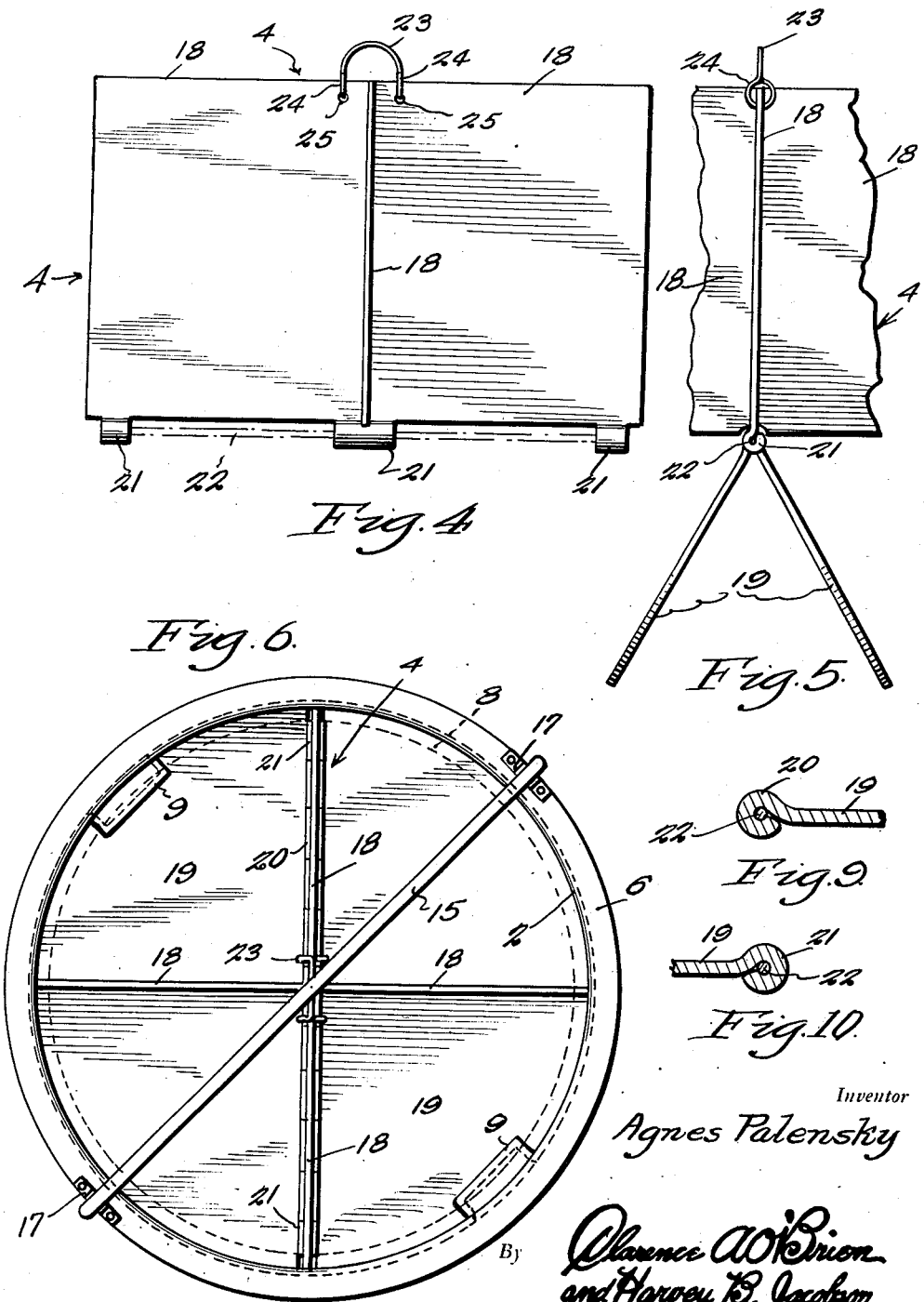
Inventor
Agnes Palensky Patented June 19, 1951

2,557,613

UNITED STATES PATENT OFFICE 2,557,613

COOKING UTENSIL

Agnes Palensky, Vermillion, S. Dak.

Application February 7, 1946, Serial No. 646,026

5 Claims. (Cl. 99—410)

My invention relates to improvements in cooking utensils for household and other uses.

The primary object of the invention is to provide an efficient, simply constructed, multiple compartments utensils for cooking either by boiling, or steaming, and which is equipped for draining the juices or liquids from the cooked food without pouring from the top and risking scalding or burning the hands, and is also designed for retaining the drained juices and liquids so as to maintain the same hot for future use.

Another object is to provide a cooking utensil of the character and for the purposes above set forth which is equipped for use, in part, as a server for serving several different cooked foods simultaneously on a plate, or the like, with the different kinds of foods separated in side by side arrangement.

Still another object is to provide a utensil particularly adapted for accomplishing the above and which involves comparatively few parts, easy to clean and maintain sanitary.

Other and subordinate objects, also comprehended by my invention, together with the precise nature of my improvements, and the manifold advantages thereof will be readily understood when the succeeding description and claims are read with reference to the drawings accompanying and forming part of this specification.

In said drawings:

Figure 1 is a view in vertical section of my improved cooking utensil in a preferred embodiment thereof, Figure 2 is a similar fragmentary view illustrating the inner container shell positioned for draining, and drawn to an enlarged scale, Figure 3 is a view in plan of the combined partition and drop bottom forming insert viewed from the bottom thereof, Figure 4 is a view in side elevation of the same detached, Figure 5 is a fragmentary similar view of the same with the bottom forming flaps swung downwardly, Figure 6 is a view in plan of the shell with the cover removed.

Figure 7 is a view of perspective of one of the hooks,

Figure 8 is a detail view of the handle and one of the keepers therefor,

Figure 9 is a fragmentary view in transverse section taken on the line 9—9 of Figure 3, and Figure 10 is a similar view taken on the line 10—10 of Figure 3.

Reference being had to the drawings by numerals, my improved cooking utensil, in the illustrated embodiment thereof, comprises, as its basic elements, an outer container 1, an inner container shell 2, a lid or cover 3 for the inner container shell 2, and a combined partition and drop bottom forming insert designated generally by the numeral 4.

The outer container 1 has the form of a cylindrical kettle provided with handles 5 arranged at diametrically opposite sides of the same.

The inner container shell 2 is of less depth than the outer container 1, also cylindrical, and dimensioned to fit into the outer container 1 with a slight clearance. An internal rim flange 6 on the inner container shell 2 rests on the rim of the outer container 1 to suspend the inner container shell 2 in said outer container 1 and provide a space 7 between said shell and the bottom of said container 1 suitable for a purpose presently to be seen. An internal circumferential bottom flange 8 on the inner container shell 2 serves a purpose to be described.

A pair of diametrically opposite side pockets 9 are formed in the inner container shell 2, preferably slightly above the horizontal center of the same, and in which a pair of bail type hooks 10 are pivoted in upstanding position by suitable keepers 11 so that said hooks 10 may swing, under the influence of gravity, out of the pockets 9 to engage over the rim of the outer container 1. Below the pockets 9, the inner container shell 2 is perforated, as at 12, to the flange 8 for draining said shell.

The lid, or cover, 3 is of the usual dome type adapted to seat on the rim flange 6 of the inner container shell 2 with a depending skirt flange 13 fitting into said shell. The usual hand grip knob 14 is provided on said lid, or cover, 3.

A bail type handle 15 with inturned ends 16 journalled in the usual keepers 17 on the rim flange 6 provides a convenient means for lifting the inner container shell 2 out of the outer container 1.

The combined partition and drop bottom forming insert 4 comprises plate-like partition members 18 arranged in 90° angular relation to form co-planar pairs extended diametrically across the inner container shell 2. The partition members 18 are of the requisite size to slidably fit into the inner container shell 2 between the lid, or cover 3, and the bottom flange 8 of said shell with said members in upstanding position and slightly clearing said flange 8 for a purpose presently seen. A pair of substantially semi-circular bottom forming flaps 18 are pivotally connected to the bottom edges of one pair of said members 18 by interfitting hinge barrels 20 on the straight edges of said flaps 19, similar hinge barrels 21 on the bottom edges of said pair of members 18, and a pintle rod 22 extended through said hinge barrels. The bottom forming flaps 19 are designed to seat on the bottom flange 8 of the inner container shell 2 to close the bottom of said shell, as will be clear, and the described hinge connection is such that said flaps may swing downwardly when the insert 4 is lifted upwardly of said shell 2. A finger grip bail 23 with eyelet ends 24 passing through apertures 25 into top edges of one pair of partition forming members 18 provides a convenient means for lifting the insert 4.

Referring now to the use and operation of the described invention. With the parts assembled in the manner described in the foregoing, the partition forming members 18, the bottom forming flaps 19 and the inner container shell 2 form a multiple compartment inner container which may be lifted bodily out of the outer container 1 for filling with different kinds of food to be cooked and then replaced filled, after a selected amount of water has been introduced into the outer container 1. In replacing the inner container, thus formed, the hooks 10 are forced back into the pockets 9 to clear the rim flange 6 so that said rim flange may seat on the rim of the outer container 1. Water is introduced into the outer container 1 to a level below the bottom forming flaps 19 if steam cooking is desired, or, to substantially the level of the pockets 9 if boiling is desired. When it is desired to drain the food, after cooking, the inner container shell 2 is lifted by the handle 15 high enough to permit the hooks 10 to swing out over the rim flange 6 and hook thereover, as shown in Figure 2. Thus the inner container shell 2, or inner container, may be suspended for draining of juices and fluids from the food into the space 7 to be maintained warm if desired. By lifting the inner container shell 2, with the food therein, out of the outer container, as by means of the handle 15, holding the same over a plate, or platter, not shown, and then lifting the insert 4 upwardly of said shell 2, through the medium of the finger grip bail 23, the bottom forming flaps 19 will be released to swing downwardly on the pintle rod 22 to release, or dump, the food in the different compartments on to the plate, or platter, in separate mounds so that such food is served simultaneously without being mixed.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. In a utensil of the character described, an outer container having a rim, an inner perforated container in the outer container adapted to be lifted therein from a lower to a higher position, rim engaging means on the inner container for suspending the inner container in said lower position, a handle on the inner container for lifting the same, a pair of pockets in opposite sides of said inner container opening toward said outer container, and a pair of upright downwardly opening suspension hooks pivoted at lower ends thereof in said pockets to swing downwardly out of said pockets over said rim when the inner container is lifted sufficiently to raise said pockets partway above said rim, said hooks straddling said rim when said inner container is subsequently lowered, whereby to suspend said inner container in said higher position, said hooks being held in said pockets against downward swinging by frictional engagement with the side of said outer container until said pockets are raised partway above said rim.

2. In a utensil, an outer container having a closed bottom, an inner container in said outer container, means to suspend the inner container in the outer container to space said inner container above the bottom of said outer container, a vertical partition insert in the inner container for dividing the same vertically into compartments, and being liftable outwardly of said inner container, and bottom forming flaps for said inner container hinged to said insert for swinging downwardly when said insert is lifted, whereby to release material in said compartments for dumping into the space between the inner container and the bottom of said outer container.

3. A utensil as set forth in claim 2 having said flaps hinged to said insert for swinging downwardly into side by side opposite relation.

4. In a utensil, a container comprising a cylindrical shell, a vertical partition insert in said shell for dividing the same vertically into compartments and being liftable outwardly of said shell, and bottom forming flaps for said shell hinged to said insert for swinging downwardly when the insert is lifted, whereby to open said compartments at the bottom of said shell.

5. A utensil as set forth in claim 4 having said flaps hinged to said insert to swing downwardly into side by side opposite relation.

AGNES PALENSKY.

REFERENCES CITED

The following references are of record in the file of this patent:

UNITED STATES PATENTS

| Number | Name | Date |
|---|---|---|
| 751,433 | Kennedy | Feb. 2, 1904 |
| 899,244 | Chase | Sept. 22, 1908 |
| 1,445,457 | Simon | Feb. 13, 1923 |
| 1,482,203 | Sakamoto | Jan. 29, 1924 |
| 1,791,889 | Duncan | Feb. 10, 1931 |
| 2,001,352 | Princiotta | May 14, 1935 |
| 2,364,073 | Howard | Dec. 5, 1944 |

FOREIGN PATENTS

| Number | Country | Date |
|---|---|---|
| 27,566 | Great Britain | Dec. 4, 1906 |
| 58,429 | Norway | Sept. 27, 1937 |
| 443,879 | Germany | May 6, 1927 |